(12) United States Patent
Nichols

(10) Patent No.: US 7,946,741 B2
(45) Date of Patent: May 24, 2011

(54) FLASHING STERN LIGHT FOR BOATS

(76) Inventor: Michael A. Nichols, Montgomery, AL (US)

( * ) Notice: Subject to any disclaimer, the term of this patent is extended or adjusted under 35 U.S.C. 154(b) by 139 days.

(21) Appl. No.: 12/382,089

(22) Filed: Mar. 9, 2009

(65) Prior Publication Data

US 2009/0237949 A1 Sep. 24, 2009

Related U.S. Application Data

(60) Provisional application No. 61/069,892, filed on Mar. 18, 2008.

(51) Int. Cl.
- B60Q 1/00 (2006.01)
- F21V 1/00 (2006.01)
- F21S 8/00 (2006.01)

(52) U.S. Cl. ............................ 362/477; 362/431

(58) Field of Classification Search .................. 362/477, 362/431, 228, 184
See application file for complete search history.

(56) References Cited

U.S. PATENT DOCUMENTS

| | | | | |
|---|---|---|---|---|
| 5,036,442 A | * | 7/1991 | Brown | 362/102 |
| 5,339,225 A | * | 8/1994 | Wiggerman | 362/477 |
| 5,381,141 A | | 1/1995 | Stahl | |
| 5,416,670 A | * | 5/1995 | Authier | 362/34 |
| 5,495,401 A | | 2/1996 | Evans | |
| 5,636,916 A | | 6/1997 | Sokolowski | |
| 5,711,591 A | * | 1/1998 | Jordan | 362/477 |
| 6,062,713 A | | 5/2000 | Rengler et al. | |
| 6,174,078 B1 | * | 1/2001 | Ohm et al. | 362/477 |
| 6,539,886 B2 | | 4/2003 | Henry et al. | |
| 6,550,414 B1 | | 4/2003 | Correll et al. | |
| 6,707,395 B1 | | 3/2004 | Greiff | |
| 7,018,081 B2 | * | 3/2006 | Hopkins | 362/477 |
| 7,367,700 B2 | * | 5/2008 | Chasmar | 362/473 |
| 2002/0044449 A1 | | 4/2002 | Von Wolske | |
| 2003/0231505 A1 | * | 12/2003 | Kirk | 362/477 |
| 2006/0198154 A1 | * | 9/2006 | Naylor | 362/473 |

* cited by examiner

*Primary Examiner* — Jong-Suk (James) Lee
*Assistant Examiner* — David R Crowe
(74) *Attorney, Agent, or Firm* — Richard C. Litman

(57) ABSTRACT

The flashing stern light for boats includes an elongated tubular base, a light source housing mounted on top of the base, a light source disposed inside the housing, an array of light emitting elements disposed along a length of the base, and wiring adapted to operative connect to a power source and/or control, wherein the array of light emitting elements flash sequentially in a pattern to thereby draw attention to the light source, warn and emphasize proximity and presence of the boat. The flashing lights enhances visibility of the boat at night and in reduced visibility conditions.

7 Claims, 2 Drawing Sheets

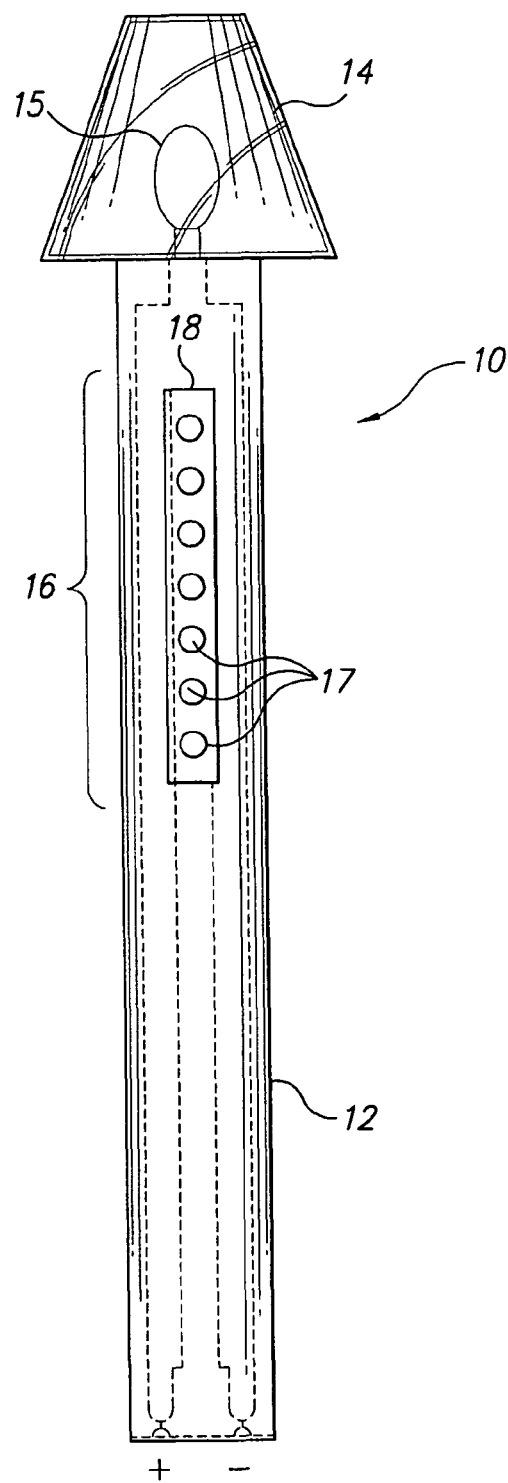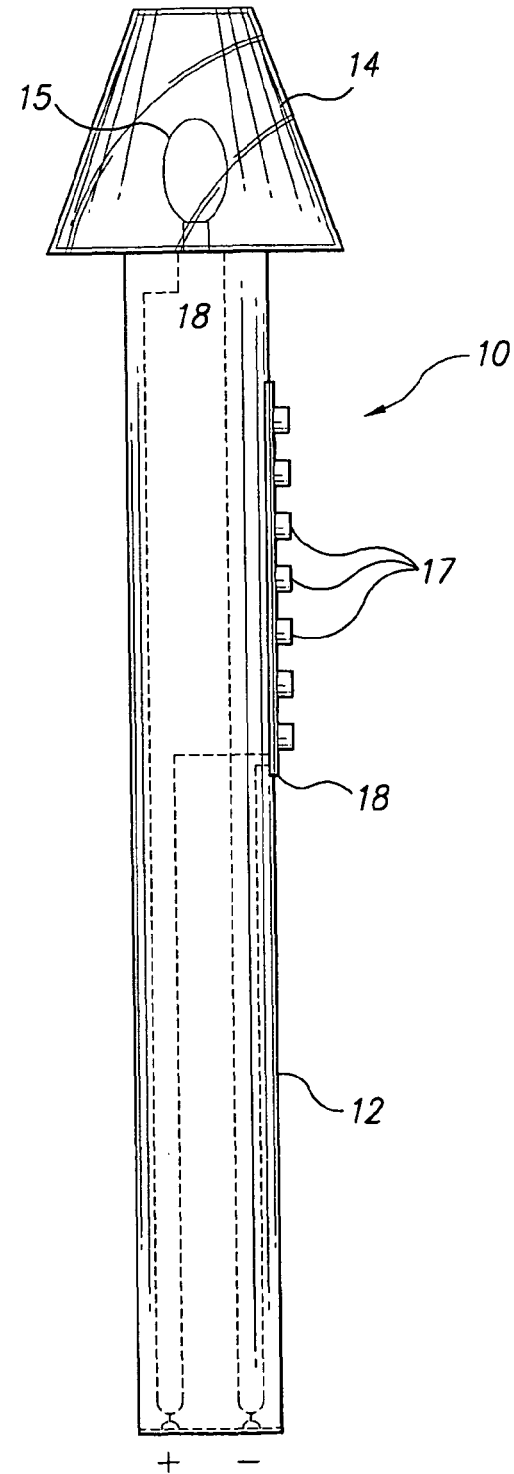
*Fig. 2*    *Fig. 3*

FLASHING STERN LIGHT FOR BOATS

CROSS-REFERENCE TO RELATED APPLICATIONS

This application claims priority to a provisional application Ser. No. 61/069,892, filed on Mar. 18, 2008.

BACKGROUND OF THE INVENTION

1. Field of the Invention

The present invention relates to nautical vessel safety devices, and particularly to a flashing stern light for boats having light emitting elements arranged in a pattern and sequentially flashing to indicate position of the vessel and thereby provide visual cues to nearby vessels of the position thereof, especially at night and reduced visibility conditions.

2. Description of the Related Art

Many people enjoy boating for recreation, fishing, transport and/or work. There is something primal about being out in the open water experiencing nature in the raw. However, navigation of the boat or nautical vessel in the evening or in adverse weather conditions where visibility is poor can be a potentially dangerous affair.

Steps have been taken to minimize potential boating accidents, e.g. collisions, through regulation set forth by prominent national and international organizations overseeing nautical vessel navigation concerns. For example, U.S. Coast Guard Navigation Rules, International Inland require sea vessels to display navigational lights between sunset and sunrise and during times of reduced visibility. For most other vessels common to most boaters, U.S. Coast Guard rules require red and green lights at the bow of the boat and a white light at the rear of the boat, the red light illuminating the port side (left), the green light illuminating the starboard side (right), and the white light illuminating 360°.

All of these lighting arrangements above attempt to warn nearby vessels of the relative proximity such that potential collisions may be avoided. However, nighttime and reduced visibility weather conditions such as rain, fog, or haze increases the difficulty of a boater in ascertaining the existence or relative distance of other vessels. At times, the lighting of other vessels may be mistaken for lights on land, which may have detrimental results. These potential hazards are more pronounced in relatively crowded harbors. Thus, it would be a great benefit in the art to have a lighting system that increases visibility and draws attention to the existing lighting on a typical boat, especially in the aft section.

Thus, a flashing stern light for boats solving the aforementioned problems is desired.

SUMMARY OF THE INVENTION

The flashing stern light for boats includes a elongated tubular base, a light source housing mounted on top of the base, a light source disposed inside the housing, an array of light emitting elements disposed along a length of the base, and wiring adapted to operative connect to a power source and/or control, wherein the array of light emitting elements flash sequentially in a pattern to thereby draw attention to the light source, warn and emphasize proximity and presence of the boat.

These and other features of the present invention will become readily apparent upon further review of the following specification and drawings.

BRIEF DESCRIPTION OF THE DRAWINGS

FIG. 2 is a front view of the flashing stern light for boats according to the present invention.

FIG. 3 is a side view of the flashing stern light for boats according to the present invention.

Similar reference characters denote corresponding features consistently throughout the attached drawings.

DETAILED DESCRIPTION OF THE PREFERRED EMBODIMENTS

Figure 1:
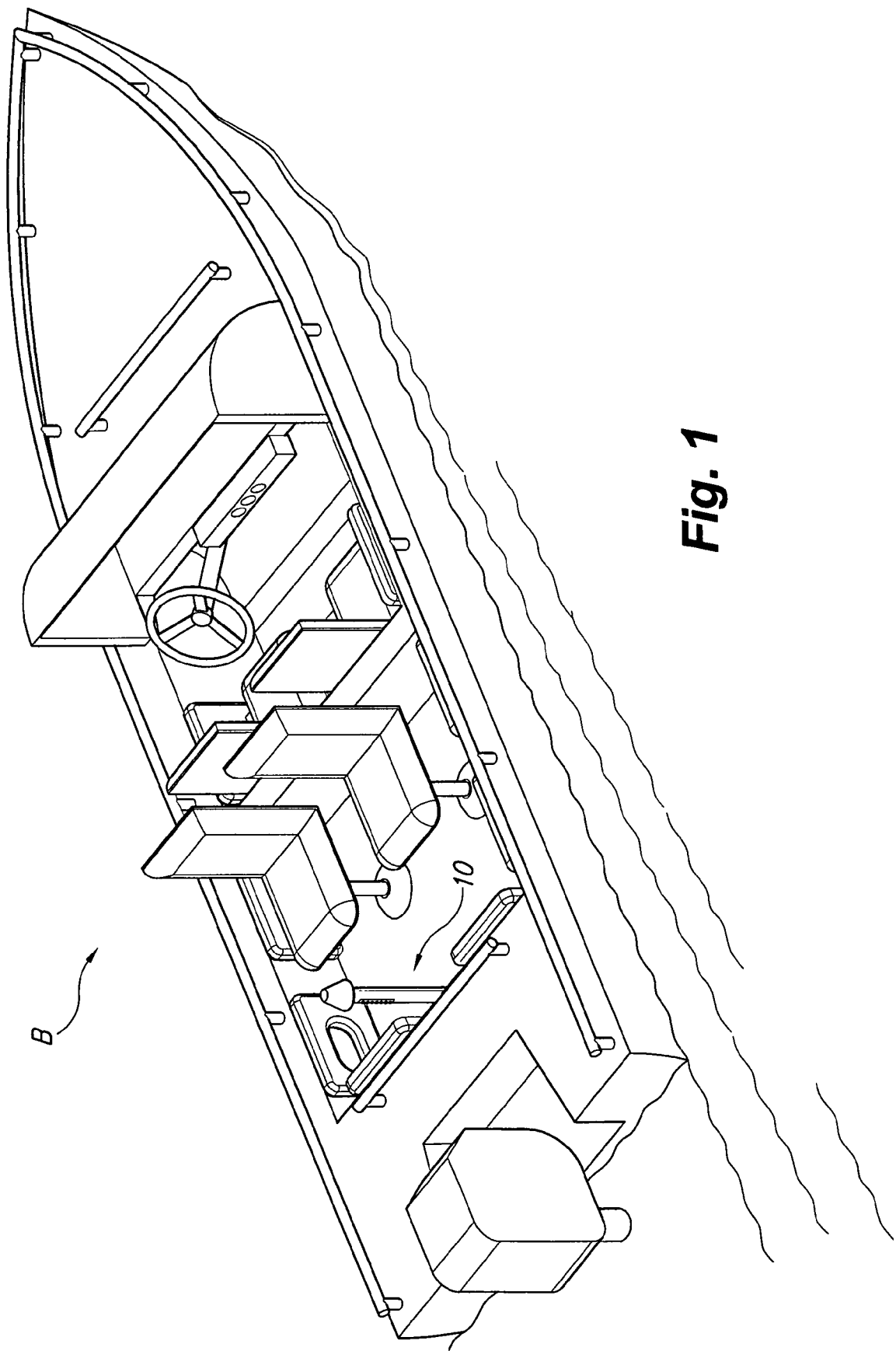
FIG. 1 is an environmental, perspective view of a flashing stern light for boats according to the present invention.

The present invention relates to a flashing stern light 10 for boats that increases the safety and effectiveness of standard globe lights at the stern of a boat or nautical vessel. The sequential flashing of the array greatly increases the visual warning of the globe light to other nearby vessels so that potential accidents may be averted.

Referring to FIG. 1, the flashing stern light 10 is disposed at the aft or rear section of the boat B. The flashing stern light 10 includes an elongated tubular base or pedestal 12 with the bottom portion thereof mounted to the boat B. A primary light source or globe light 15 is disposed at the top of the base 12 inside a translucent or transparent, globe light or light source housing 14. As required by regulations, the globe light 15 emits white light in a 360° range so that it is visible from any direction. The globe light 15 does not flash. In addition, the color of the light is white because it is distinguishable from the colored lights used by marine authorities as well as for normal navigation purposes.

Referring to FIGS. 2 and 3, an array of secondary light sources or light emitting elements 16 is disposed below the globe light housing 14 along the length of the base 12. The array 16 includes a substantially rectangular mounting bracket 18 with a plurality of secondary light sources or light emitting elements 17 disposed thereon. These light emitting elements 17 may be LEDs (light emitting diodes) or other discrete illumination sources that can produce light in a variety of colors. When assembled, the array 16 is preferably directed towards the rear of the boat B, so that the lights from the array 16 are only visible at the stern. This arrangement ensures that the lights from the array 16 do not shine towards the bow and possibly interfere with visibility of the pilot or the passengers within the boat B and to ensure anyone from the rear can see both the array of lights 16, 17 and the globe light 15. The wires 20 connect both the globe light 15 and the light emitting elements 17 to a power source and/or control for the same.

In operation, the array of lights 16 is configured so that the light emitting elements 17 flash in a predetermined sequence. For example, the light elements 17 may sequentially flash up and/or down or both. Another sequence may have the lights flashing in opposite directions along the length of the bracket 18 originating from one or more of the elements 17 or in a variety of patterns. Whatever the sequence may be, the operation of the light elements 17 draws attention to itself and the globe light 15 so that the visibility of the boat B is emphasized and thereby warning nearby vessels of the proximity of the boat B. Thus, nautical safety is increased. To further enhance visibility of the array 16, the light emitting elements 17 may be configured to produce any combination of colored light that does not conflict with colors exclusive to marine navigation and marine authority use, i.e. neutral colored light.

It is noted that the flashing stern light 10 may encompass a variety of alternatives to the various features thereof. For example, the flashing stern light 10 may be made from water and corrosion resistant materials such as wood, plastic, and metal. The flashing stern light 10 may be of any size and shape as long as it does not hinder visibility thereof. Moreover, the globe light housing may be of any size and shape that allows 360 degree emission of light. Furthermore, the power source may be a direct connection to the existing power source of the boat B, a separate battery, or solar power.

It is to be understood that the present invention is not limited to the embodiments described above, but encompasses any and all embodiments within the scope of the following claims.

I claim:

1. A flashing stern light for boats, comprising:
an elongated base adapted for detachable mounting to the stern of a boat, the base being opaque and having an outer surface, a top and bottom;
a primary light source housing disposed at the top of the base, wherein the primary light source housing is transparent and configured to permit 360° emission of light;
a primary light source disposed in the housing, wherein the primary light source is a globe bulb emitting white light;
a vertical array of selectively actuatable flashing secondary light sources disposed below the housing, the array of secondary light sources further includes a substantially rectangular mounting bracket and the secondary light sources being arranged on the mounting bracket wherein the light sources are disposed on the outer surface of the elongated base and define the sole light source on the base below the primary light source, whereby the array of lights is directed towards the rear of the boat upon placement of the light at the stem of the boat; and
wiring connecting both the primary and secondary light sources to a power source and/or control;
wherein the secondary light sources are selectively actuated in a predetermined sequence of patterns to draw attention to the primary light source and the boat's proximity so that potential collision may be averted.

2. The flashing stem light for boats according to claim 1, wherein the secondary light sources are LEDs.

3. The flashing stem light for boats according to claim 1, wherein the secondary light sources are discrete light emitting elements.

4. The flashing stem light for boats according to claim 1, wherein the secondary light sources emit colored light.

5. The flashing stem light for boats according to claim 1, wherein the power source is selected from the group of boat electrical power, separate battery or solar energy.

6. The flashing stem light for boats according to claim 1, wherein the array of lights flash in a predetermined sequence.

7. The flashing stern light for boats according to claim 1, wherein the mounting bracket is disposed on the outer surface of the elongated base.

* * * * *